United States Patent Office 2,763,562
Patented Sept. 18, 1956

2,763,562
CELLULOSE ACETATE-BUTYRATE COMPOSITIONS CONTAINING 3-METHOXY BUTYL MYRISTATE

Lester W. A. Meyer and Margaret H. Broyles, Kingsport, Tenn., assignors to Eastman Kodak Company, Rochester, N. Y., a corporation of New Jersey No Drawing. Application November 18, 1953,
Serial No. 392,994

1 Claim. (Cl. 106—179)

This invention relates to compositions of matter in which cellulose acetate-butyrate is combined or mixed with 3 methoxy butyl myristate, with or without a common solvent for both, and with or without other useful addition agents, so that the resulting product will have properties such as will make the composition highly advantageous for use in the plastic and analogous arts, such, for instance, as the manufacturing of molding compounds and products, coating compositions and the like.

One object of this invention is to produce compositions which can be molded at elevated temperatures and high pressures to produce plastic products having the desirable properties of hardness, toughness and elasticity.

We have discovered that valuable properties may be induced in and/or contributed to compositions containing cellulose acetate-propionate or acetate-butyrate by adding thereto, as a plasticizing compound, 3-methoxy butyl myristate,

3-methoxy butyl myristate was prepared as follows. In a 5-liter, 3-necked flask fitted with an agitator and an automatic decanting reflux condenser were placed 1,286 g. (12.3 moles) of 3-methoxy butanol and 2,280 g. (10 moles) of myristic acid. The mixture was refluxed for 95 hours to lower the acid number to 12.88 mg. KOH/gram ester. The batch was neutralized with 15 g. of MgO. The solid material was filtered out by means of filter aid, and the low boilers were removed on the steam cone under reduced pressure. The residue was distilled under vacuum, the following fractions being collected:

1, 108 g. at 65–118° C. at 0.05 mm.
2, 100 g. at 118–130° C. at 0.05 mm.
3, 2,280 g. at 131–135° C. at 0.05 mm.

The yield of fraction #3 was 72%, calculated on the myristic acid. This fraction had the following characteristics:

Saponification equivalent (theoretical 314) _____ 323.22
Percent acid _____ 0.090
Color (p. p. m.) _____green__ 100
Heat test color (p. p. m.):
    1-hour _____green__ 95
    2-hour _____green__ 95
Percent heat test acid _____ 0.200
Freezing point _____° C__ −5

Our novel plasticizer is useful with cellulose acetate-butyrate or cellulose acetate-propionate of all types. It may be compounded with the cellulose ester with or without the aid of a common solvent for the cellulose ester and the plasticizer. For the preparation of molding compositions, from about 2 to about 22 parts of the plasticizer, depending on the hardness or softness of the plastic desired, may be homogeneously mixed with 100 parts of cellulose acetate-butyrate or cellulose acetate-propionate, for instance by working on hot rolls, and the mixture converted into a transparent or translucent plastic product by molding at a temperature of 275° to 360° F. and a pressure of 2000 to 3000 pounds per square inch, in a manner well known to those skilled in molding compounds of that nature. The softer plastics may be extruded through a die, or injection molded. Pigments, antioxidants, mold lubricants, etc. may be included in the composition if desired.

As illustrations of molding compositions in which our novel plasticizer is used, we give the following examples.

*Examples.*—Portions, of one hundred parts by weight, of cellulose acetate-butyrate having a butyryl content of 35.0% to 39%, an acetyl content of 12.0% to 14.0%, and a propionyl content of 2.0% maximum, with a viscosity of 18–28 seconds measured in 20% acetone dope at 20° C., were mixed and rolled with the amounts indicated in the following table, of 3-methoxy butyl myristate, and the composition was pelleted. No difficulty was experienced in the processing of these compositions. Test samples were compression molded, and their physical properties tested by the American Society for Testing Materials methods indicated in the table. The results obtained are shown in the following table. The term "T. E. C. Method" refers to a method of testing developed at Tennessee Eastman Corporation.

| Parts Plasticizer | | | | 3 | 6 | 10 | 15 | 22 |
|---|---|---|---|---|---|---|---|---|
| Property | Temp. °F. | R. H. Percent | ASTM Method | | | | | |
| Flow Temperature, °F | | | D569–48 | 323 | 311 | 298 | 290 | 275 |
| Designation | | | | H2 | H | MH | M | S |
| After Heat Test | | | | H2 | H | MH | MS | S2 |
| Specific Gravity | 73.4 | 50 | D792–48T | | | | | |
| Hardness, Rockwell R Scale | 73.4 | 50 | D785–48T | 107 | 101 | 94 | 78 | 48 |
| Impact Strength, Ft. lbs./inch of notch | −40 | | D256–47T | .99 | .91 | 1.55 | 1.69 | 2.02 |
| | 73.4 | 50 | | 1.11 | 1.68 | 1.90 | 2.92 | 4.57 |
| Elongation, Percent | 73.4 | 50 | D638–49T | 54.00 | 56.00 | 62.00 | 57.00 | 55.00 |
| Tensile Strength, P. S. I | 73.4 | 50 | D638–49T | 6,140 | 5,655 | 5,150 | 3,985 | 3,120 |
| | 158 | | | 4,675 | 3,820 | 2,800 | 2,470 | 2,435 |
| Tensile Strength at Upper Yield | 73.4 | 50 | D638–49T | | | | | |
| Modulus of Elasticity, P. S. I | 73.4 | | T. E. C. Method | 1.60 | 1.45 | 1.30 | 1.05 | .85 |
| Distortion under Heat, °F: | | | | | | | | |
|   264 P. S. I. Load | | | D648–45T | 162 | 151 | 141 | 130 | 126 |
|   66 P. S. I. Load | | | | | | | | |
| Water Absorption, Percent | 73.4 | | D570–42 | 2.02 | 1.77 | 1.67 | 1.60 | 1.54 |
| Soluble Loss, Percent | 73.4 | | | +.13 | +.08 | +.02 | +.07 | +.17 |
| Accelerated Aging, 72 Hours— Weight Loss, Percent | 180 | | D707–47T | .06 | .152 | .612 | 1.64 | 2.05 |
| Exudation: | | | | | | | | |
|   72 Hours | 100 | 80 | | OK | OK | OK | OK | OK |
|   24 Hours | 140 | 88 | | OK | OK | OK | OK | Exuded |

What we claim as our invention and desire to be secured by Letters Patent of the United States is:

A molding composition adapted for molding under elevated temperatures and high pressures, comprising 100 parts by weight of cellulose acetate-butyrate and from about 2 parts to about 22 parts by weight of 3-methoxy butyl myristate.

References Cited in the file of this patent

UNITED STATES PATENTS 2,521,906  Gearhart et al. _____ Sept. 12, 1950